Nov. 23, 1926.

J. C. HULL 1,608,067

HOSE APPARATUS

Filed May 21, 1925

Inventor
John C. Hull

By Bacon & Thomas
Attorneys

Patented Nov. 23, 1926.

1,608,067

UNITED STATES PATENT OFFICE.

JOHN C. HULL, OF GASPORT, NEW YORK.

HOSE APPARATUS.

Application filed May 21, 1925. Serial No. 31,863.

The invention relates to improvements in an apparatus for testing the strength of a hose adapted for conducting a liquid under pressure.

It is well recognized in the art that a hose when in use is frequently subjected to various kinking, and when containing a liquid under high pressure often yields or gives way at a weakened portion of the hose. It requires, however, a considerable period of use in order to bring out the defects of a hose in this manner.

The present invention relates to an apparatus by which the hose can be fully tested for any defects prior to its being put in use. The apparatus aims to subject the hose during its testing operation to substantially the same treatment as it is likely to get when in actual use, and thereby develop any weaknesses that will otherwise appear after the hose has gone in use.

In the accompanying drawings.

Figure 1:
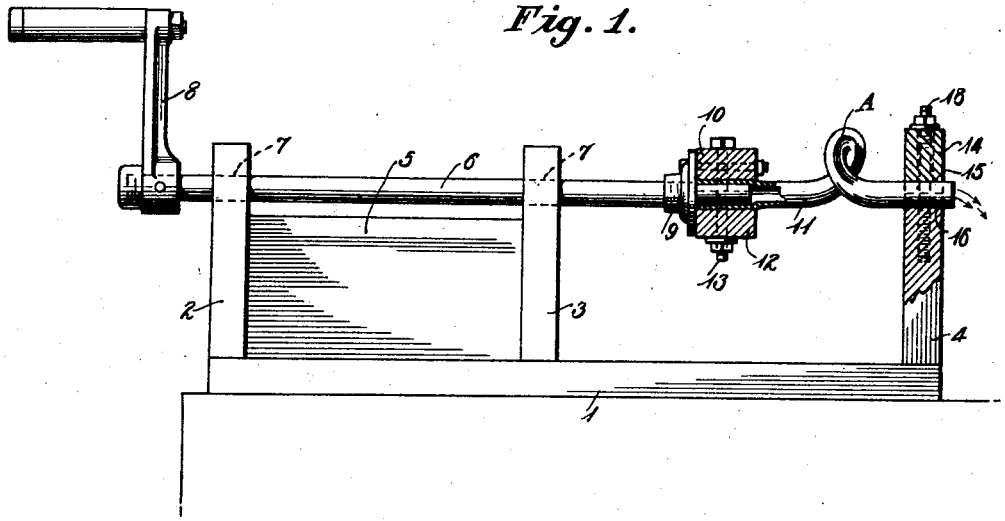
Figure 1 represents a side elevation of my device.

Referring now more particularly to the drawings, wherein like reference characters indicate corresponding parts, the numeral 1 designates a base having the three separated uprights 2, 3 and 4. The uprights 2 and 3 constitute a bearing for the hose testing crank and are spaced apart by a spacer 5. The crank embodies a metallic arm 6 seated within bearings 7 in the uprights 2 and 3 and capable of a rotation as well as a lateral movement in said bearings. A handle 8 is fixedly attached to this shaft by means of which the shaft is rotated.

Figure 2:
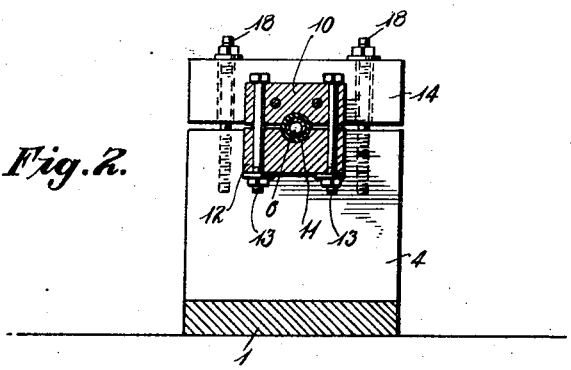
Figure 2 is a view partly in section of the clamping device for the hose.

At its outer end the shaft is provided with a collar 9 having attached thereto a stationary clamp 10 by means of bolts or the like. As shown in Figure 2, the shaft 6 extends within the clamp. A removable clamping plug 12 is detachably fitted to the block 10 by fastening screws 13 by means of which the hose 11 is tightly gripped between the stationary and movable clamping blocks. The upright 4, near its upper end, is provided with a removable clamping section 14 having a semi-circular clamping opening 15 therein adapted to register with a small opening 16 in the outer edge of the block 4. Fastening bolts 18 are fixedly attached to the standard 4 and passed through apertures in the bearing or clamping member 14. By tightening these bolts the hose is firmly held in position.

It will be understood that in the use of this device one end of the hose is clamped between the clamps 10 and 12 while another portion of the hose is clamped by the clamping device 14. The handle 8 is then rotated causing a rotary movement of the shaft. The hose may contain a liquid under pressure during this operation which of course must be introduced to the hose before it is placed in the clamping apparatus and must be retained therein by plugs or the like. As the shaft 6 continues to rotate, kinks, as indicated by the character A, will form in the hose due to the lateral movement of the clamping head 10 towards the upright 4. This will subject the hose while under pressure to substantially the conditions under which it is employed when in actual use. In other words, before using a piece of hose it is thoroughly tested to show clearly that it contains no imperfections and is then applied to a spraying machine or the like. It will be apparent that various forms of clamping devices can be used for retaining the hose in a clamped position without departing from the spirit of this invention.

Having thus described my invention, what I claim is:

1. A hose testing machine comprising a base, a shaft mounted thereon adapted to have a rotary sliding movement, means for connecting the shaft at one end to a hose, and means carried by the base for clamping another portion of the hose.

2. In a hose testing machine, the combination with a base, a rotatable and slidable element carried thereon, means for connecting one end of a hose to said element and means for clamping another portion of the hose against a turning movement on said base.

3. In a hose testing machine, the combination with a base, a horizontal shaft supported thereon capable of a rotary and longitudinal movement, a handle for said shaft, a clamping device at the forward end of the shaft for retaining a portion of the hose in a clamping position and a clamping element carried by said base for engaging and clamping another portion of the hose.

In testimony whereof I affix my signature.

JOHN C. HULL.